(12) United States Patent
Hullmann et al.

(10) Patent No.: US 8,993,069 B2
(45) Date of Patent: Mar. 31, 2015

(54) METHOD FOR PRODUCING A BAND-SHAPED PLASTIC FILM

(75) Inventors: Dirk Hullmann, Hamburg (DE); Dieter Jeske, Wentorf (DE); Daniel Starke, Hamburg (DE)

(73) Assignee: Tannpapier GmbH, Traun (AT)

( * ) Notice: Subject to any disclaimer, the term of this patent is extended or adjusted under 35 U.S.C. 154(b) by 232 days.

(21) Appl. No.: 13/518,473

(22) PCT Filed: Dec. 23, 2010

(86) PCT No.: PCT/AT2010/000492
§ 371 (c)(1),
(2), (4) Date: Oct. 4, 2012

(87) PCT Pub. No.: WO2011/079340
PCT Pub. Date: Jul. 7, 2011

(65) Prior Publication Data
US 2013/0022735 A1    Jan. 24, 2013

(30) Foreign Application Priority Data
Dec. 23, 2009   (AT) .................. A 2034/2009

(51) Int. Cl.
*B05D 1/28*   (2006.01)
*B05C 1/08*   (2006.01)
(Continued)

(52) U.S. Cl.
CPC ............ *B05D 1/28* (2013.01); *B05C 1/0808* (2013.01); *B05C 1/083* (2013.01); *B05D 5/061* (2013.01);
(Continued)

(58) Field of Classification Search
CPC ........ B05D 1/28; B05C 1/0808; B05C 1/083; C09J 7/0246

USPC ....................................... 427/428.1
See application file for complete search history.

(56) References Cited

U.S. PATENT DOCUMENTS 4,249,547 A    2/1981   Hinzmann
4,342,613 A *  8/1982   O'Leary et al. ............... 156/310
(Continued)

FOREIGN PATENT DOCUMENTS

DE    2 535 897    2/1976
DE    197 24 648   12/1998
(Continued)

OTHER PUBLICATIONS

Definition of Adhesive from Hawley's Condensed Chemical Dictionary, publised online Mar. 15, 2007, Screen capture from : http://onlinelibrary.wiley.com/doi/10.1002/9780470114735.hawley00263/full.*

(Continued)

*Primary Examiner* — Nathan Empie
(74) *Attorney, Agent, or Firm* — Collard & Roe, P.C.

(57) ABSTRACT

The invention relates to a method for applying an adhesive (2) to a substrate (3) by means of an intaglio printing plate, wherein the adhesive (2) is applied to the substrate (3) only in predefined areas using two rotating rollers, of which one is designed as a plate cylinder (5) and one is designed as an impression cylinder (6), wherein the plate cylinder (5) and the impression cylinder (6) rotate together in the transport direction of the substrate (3), wherein the adhesive (2) is applied by means of at least one recess (8) formed on the surface of the plate cylinder (5), the at least one recess having a larger depth in a front section (16) than in a rear section (17) with respect to the direction of rotation of the plate cylinder (5).

8 Claims, 2 Drawing Sheets

(51) Int. Cl.
*C09J 7/02* (2006.01)
*B05D 5/06* (2006.01)
*B05D 7/04* (2006.01)
*B41M 1/10* (2006.01)
*B41M 3/00* (2006.01)

(52) U.S. Cl.
CPC ............... *B05D 7/04* (2013.01); *B05D 2252/02* (2013.01); *B41M 1/10* (2013.01); *B41M 3/006* (2013.01); *C09J 7/0246* (2013.01); *C09J 2201/28* (2013.01)
USPC ...................................... 427/428.1

(56) References Cited

U.S. PATENT DOCUMENTS

| | | | |
|---|---|---|---|
| 4,587,152 A | 5/1986 | Gleichenhagen et al. | |
| 4,845,374 A * | 7/1989 | White et al. | 250/559.4 |
| 5,427,235 A * | 6/1995 | Powell et al. | 206/245 |
| 5,578,352 A * | 11/1996 | Smith | 428/40.1 |
| 5,858,093 A | 1/1999 | Saitoh et al. | |
| 6,942,894 B2 * | 9/2005 | Alberg et al. | 427/256 |

FOREIGN PATENT DOCUMENTS

| | | |
|---|---|---|
| EP | 0 149 135 | 7/1985 |
| EP | 0 730 914 | 9/1996 |
| FR | 2 873 382 | 1/2006 |
| GB | 1 516 984 | 7/1978 |
| WO | WO 2007/085708 | 8/2007 |
| WO | WO 2008/027816 | 3/2008 |
| WO | WO 2010/037139 | 4/2010 |
| WO | WO 2010/044201 | 4/2010 |

OTHER PUBLICATIONS

International Search Report of PCT/AT2010/000492, date of mailing Jun. 29, 2011.
International Preliminary Report on Patentability of PCT/AT2010/000492, Jun. 29, 2012.

* cited by examiner

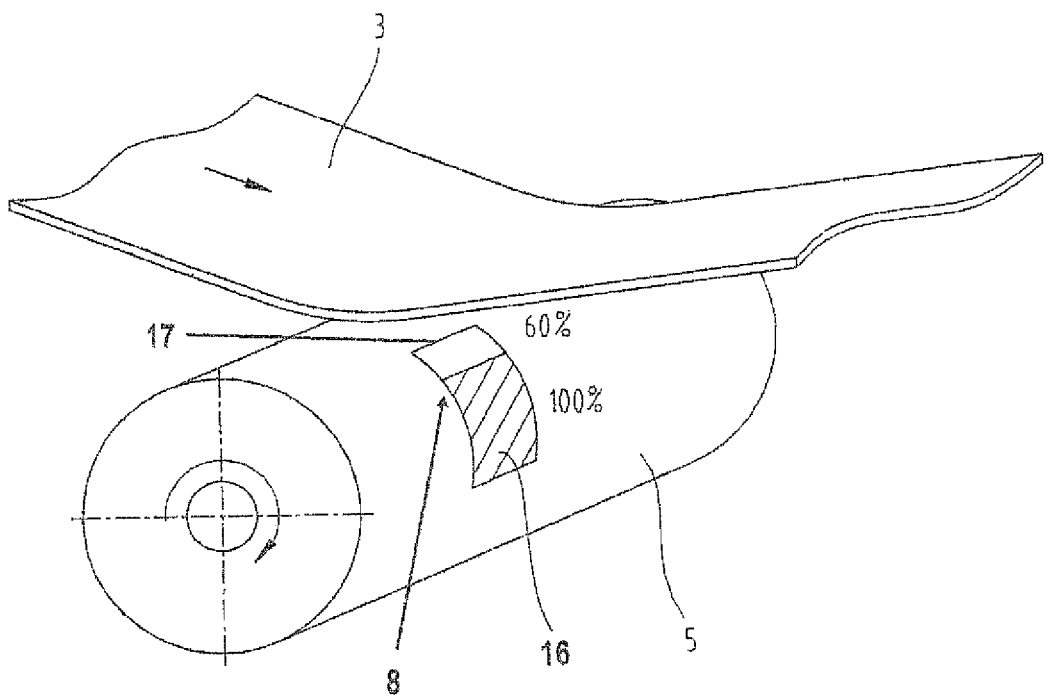

METHOD FOR PRODUCING A BAND-SHAPED PLASTIC FILM

CROSS REFERENCE TO RELATED APPLICATIONS

This application is the National Stage of PCT/AT2010/000492 filed on Dec. 23, 2010, which claims priority under 35 U.S.C. §119 of Austrian Application No. A 2034/2009 filed on Dec. 23, 2009, the disclosure of which is incorporated by reference. The international application under PCT article 21 (2) was not published in English.

The invention relates to a method for applying an adhesive to a substrate by means of an intaglio printing method, in which the adhesive is applied to the substrate only in predefined areas using two rotating rollers, of which one is in the form of a printing cylinder and one is in the form of an impression roller, in which the printing cylinder and the impression roller rotate together in a transport direction of the substrate.

Furthermore, the invention relates to a device for applying adhesive to a substrate by means of an intaglio printing method, in which the device comprises a printing cylinder and an impression roller, in which the printing cylinder and the impression roller are configured as rollers driven rotating together in a transport direction of the substrate.

A method and a device of the aforementioned type are known from WO2007/085708. The known solution comprises a printing cylinder, in which elongated or point-like recesses are formed for holding the adhesive. A similar solution is also known from WO 2008/027816.

DE 2535897 A1 relates to a method and a device for producing adhesive labels, in which the adhesive is applied to the rear of a label by means of an engraving roller.

EP 0149135 B1 describes a removable adhesive surface structure with approximately spherical adhesive points. The method used for producing the surface structure can be an intaglio or a screen printing method.

From DE 197 24 648 a method is known in which an adhesive is applied in a grid-like manner onto a substrate, such as a paper web or a paper web coated with silicon etc., by means of a screen, flexo or intaglio printing method.

U.S. Pat No. 4,249,547 relates to a device for applying an adhesive onto a wrapping material for a cigarette. In the known device an engraved printing cylinder is used, which with a surface section dips into a container 38 containing adhesive. The printing cylinder has areas for two different applications of adhesive. Areas running in circumferential direction for a first application of adhesive consist of deeply engraved surfaces with a narrow strip width. The area for the second application of adhesive has a less deeply engraved surface than the areas for the first application of adhesive. Furthermore, the printing cylinder is in contact with an application roller and transfers the adhesive to the latter. The adhesive is transferred by the application roller to the wrapping material.

EP 0 730 914 relates to a device for applying adhesive to a material. In the known method the application of adhesive is performed by means of a printing cylinder which comprises recesses and an impression roller.

The subject matter of document U.S. Pat No. 5,858,093 is a method for the application of liquids onto paper by means of a cylinder with a structured surface. To pick up the liquid areas of the cylinder dip into a container containing the liquid. A roller denoted as a carrying roller is arranged opposite the cylinder and spaced apart from the latter. The paper is guided between the cylinder and the roller.

FR 2873382 relates to a method for the grid-like application of an adhesive to a substrate by means of two rollers.

However, the known methods have the disadvantage that it is not possible thereby to achieve a precise application of adhesive solely and accurately in predefined areas, as there may be an unwanted distribution of the adhesive on the substrate during the application. This is a disadvantage mainly in the case of printed films, as here often an exact and precise delimitation of the areas with adhesive and printed areas is desired. Furthermore, during a processing stage of the substrate it may be necessary for the adhesive side of the substrate to be in contact with guiding rails or similar components of the processing machine. Adhesive that is not applied exactly or all over the surface may cause adhesion and lead to machine failure.

Therefore, an objective of the invention is to enable the partial application of adhesive to a substrate in precisely defined areas.

This objective is achieved by means of a method of the aforementioned type in that the adhesive is applied by means of at least one recess applied to the surface of the printing cylinder, which recess in a front section in relation to the rotational direction of the printing cylinder has a greater depth than a rear section.

One benefit of the invention is to enable the precise application of adhesive to the substrate, the surface of the printing cylinder being configured according to the geometry of the areas in which the adhesive is to be applied. On the basis of the application of adhesive according to the invention in an intaglio printing method according to the unidirectional principle, a very sharp and precise delimitation of the adhesive edge from an adhesive-free area is also achieved. By means of the invention it is also possible to achieve a uniform application of adhesive with a very sharp and clean edge between areas with adhesive and areas without adhesive.

The aforementioned problem can also be solved according to the invention by a method for producing a band-shaped plastic film, which comprises at least one printed image and is provided with an adhesive, in that the adhesive is applied according to the method of the invention.

According to one advantageous variant of the invention the adhesive used is a self-adhering adhesive. This embodiment is an advantage mainly for applications in which the film is to be adhered to an object at a later time.

The exact alignment of the adhesive and the printed image is facilitated in that the printed image is applied prior to the application of adhesive onto the film.

In order to check the exact alignment of the adhesive application, at least one position of the applied adhesive on the substrate can be determined optically.

According to one advantageous variant of the invention a transparent film is used as the film. This embodiment of the invention is mainly an advantage if the adhesive and the printed image are applied onto the same side of the film. The printed image can then be seen in the adhered state through the transparent film and is also protected from getting dirty.

To prevent the film becoming locked during a rolling up process, on the side of the film opposite the adhesive at least one non-stick adhesive coating, in particular a silicon coating, can be applied.

According to a preferred variant of the invention by means of the method according to the invention a sleeve is produced for cigarette packaging. This embodiment of the invention has the advantage that many difficulties associated with the production of sleeves for cigarette packaging, in particular the precise application of adhesive in alignment with the imprint of the sleeve, can be overcome.

The aforementioned problem can be also be solved by means of a device of the aforementioned kind, in which according to the invention the printing cylinder comprises at least one recess on its surface for applying the adhesive to the substrate, which in a front section in relation to the rotational direction of the printing cylinder has a greater depth than in a rear section.

Furthermore, the device can comprise at least one optical measuring means for determining at least one position of the adhesive applied to the substrate.

The invention and further advantages thereof are described in more detail in the following with reference to several non-restricting exemplary embodiments, which are shown in the drawings. In the latter in schematic form:

FIG. 4 shows a perspective view of the printing cylinder from FIG. 2.

Figure 1:
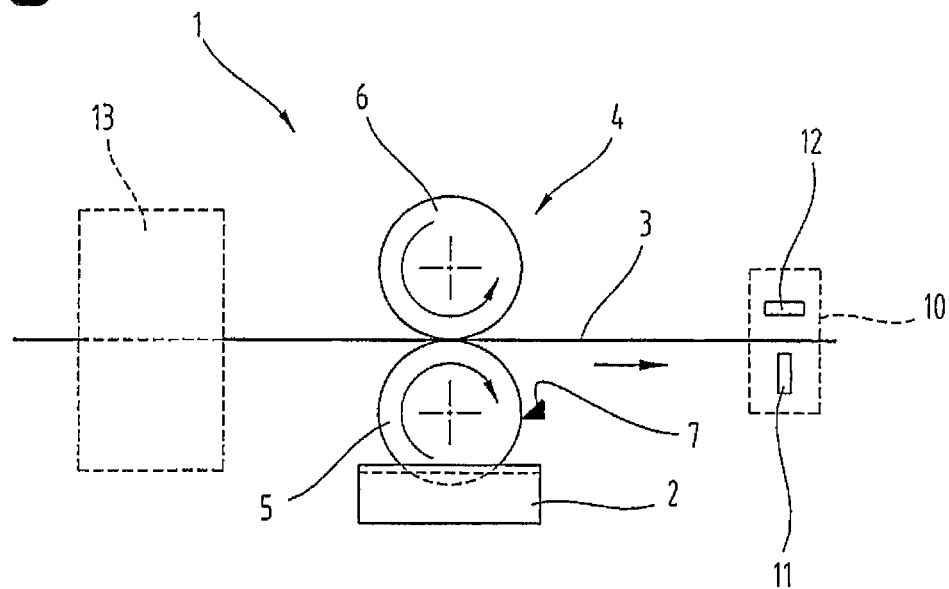
FIG. 1 shows a device according to the invention.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

According to FIG. 1 a device 1 according to the invention for applying an adhesive 2 to a substrate comprises an intaglio printing device 4. The intaglio printing device 4 comprises a printing cylinder 5 and an impression roller 6.

The substrate 3 has a flat, band-shaped structure and is preferably a plastic film, which is colourlessly transparent but can also be interspersed with colour pigments. However, the substrate 3 can also be made of any other material.

The printing cylinder 5 and the impression roller 6 are configured according to the invention as rollers driven to rotate together in a transport direction of the substrate 3. The transport direction of the substrate 3 is indicated in FIG. 1 by an arrow and in the figure runs from left to right.

In the method according to the invention the adhesive 2 is applied by means of the printing cylinder 5 and the impression roller 6. To pick up the adhesive 2 the printing cylinder 5 can be dipped for example into a container of adhesive 2. On the surface of the printing cylinder 5 recesses "saucers" are formed, which are provided for holding the adhesive 2. Sections which are not intended to pick up adhesive 2 are at a consistently higher level than the saucers. Excess adhesive 2 can be scraped off for example by squeegee 7 from the surface of the printing cylinder 5, so that the adhesive 2 is only located in the saucers.

Figure 2:
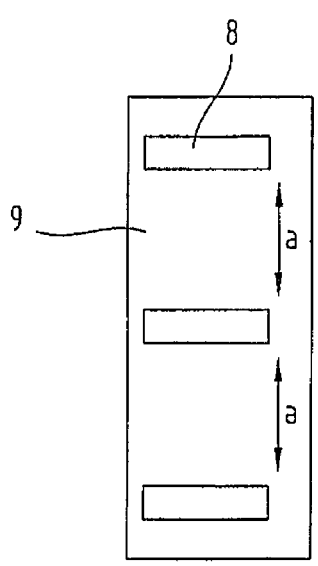
FIG. 2 shows a plan view of a printing cylinder of the device from FIG. 1.

FIG. 2 shows a surface section of the printing cylinder 5. The surface of the printing cylinder 5 is configured according to the desired shape and position of the application surfaces of the adhesive 2 on the substrate 3. In the present representation the recesses or "saucers" are denoted by reference number 8. The surface sections 9 which do not hold adhesive 2 are preferably arranged at the same level and are raised in relation to the saucers 8. The saucers 8 are arranged at a distance a from one another on the surface of the printing cylinder 5. It should be mentioned at this point that the saucers 8 can be arranged in any desired configuration on the surface of the printing cylinder 5.

By means of the pressing force exerted by the impression roller 6 the adhesive 2 is transferred from the printing cylinder 5 to the substrate 3. The impression roller 6 and printing cylinder 5 are operated according to the invention according to a unidirectional principle. According to this principle the impression roller 6 and the printing cylinder 5 rotate in the transport direction of the substrate 3. The relative movements of the impression roller 6 and printing cylinder 5 correspond in this way to the movements of two intermeshing gears. By means of the arrangement according to the invention the image of the surface of the printing cylinder 5 can be transferred exactly onto the substrate 3.

Figure 3:
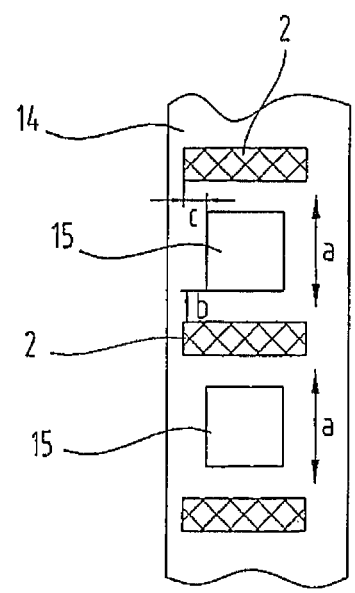
FIG. 3 shows a plan view of a film produced by the device from FIG. 1.

The device 1 according to the invention can also be used for producing a plastic film 14 shown in FIG. 3, which comprises printed images 15 and is provided with the adhesive 2.

The plastic film 14 can for example be made from MOPP, BOPP, PET, PVC, OPS, PE, PLA. In addition, coextruded, laminated or differently finished films can be used. The film material can be transparent or can be interspersed with colour pigments. The surface of the plastic film 14 can be smooth or have a special structure in order to achieve haptic effects for example. Furthermore, the printability can be optimised by using chemical or mechanical methods.

The use of a transparent plastic film 14 is mainly an advantage for the production of sleeves for cigarette packaging, as in cigarette packaging where health warnings are printed onto the upper packaging edge; such warnings have to be legible in spite of the application of a sleeve. Furthermore, cigarette packaging made from a soft material is often held together by the sleeve at the upper packaging edge, so that the application of the sleeve in the region of the printed health warning may be unavoidable. By using a transparent plastic film 14 it can be ensured that despite the attachment of the sleeve the health warning printed on the cigarette packaging can still be read.

The printed image 15 that a sleeve can show can be applied to the plastic film 14 by means of a printing device provided in FIG. 1 with reference number 13. In this way different printing methods can be used, for example intaglio printing, flexo printing, digital printing or web offset printing.

More preferably, the printed image 15 is applied to the same side of the plastic film 14 to which adhesive 2 is applied. On the rear side, i.e. the side opposite the adhesive 2 and the printed image 15 the plastic film 14 can have a non-stick coating, for example in the form of a silicon coating. In this way when rolling up the printed plastic film 14 provided with the adhesive 2 locking of the film can be prevented. The non-stick coating (silicon coating) can also function in cigarette packaging as a layer which prevents the packaging film wrapping around the cigarette packaging forming a seal with the sleeve and/or the plastic film 14.

The application of silicon coating onto the plastic film 14 is preferably performed prior to the application of the printed image 15 and the adhesive 2.

As also shown in FIG. 1, the device 1 can comprise at least one optical measuring device 10 for detecting positions of the adhesive 2 applied to the substrate 3 or the plastic film 14. The measuring device 10 can comprise for example a light source 11 and a corresponding sensor 12. The light source 11 can for example emit light in the visible, UV or infrared range. The light source 11 can also be configured as a laser. By means of the sensor 12 for example the intensity of light penetrating through the plastic film 14 or the substrate 3 and emitted by the light source 11 can be measured, and with reference to fluctuations in intensity the positions of the adhesive 2 on the plastic film 14 or substrate 3 can be inferred. Of course, any other method of optically detecting the position of the adhesive 2 is possible. Thus for example also UV active colour pigments can be added to the adhesive, which can be excited by UV light, where the position can be detected by detecting the UV light radiated by the adhesive 2. The above measuring methods are given by way of example only. At this point is should be mentioned that any other optical measuring method can be used for checking the application of adhesive.

With reference to the measured position of the adhesive 2 it is possible to establish whether the latter coincides with a reference position.

The reference position of the adhesive 2 on the plastic film 14 can be defined according to FIG. 3 for example by the distances b and c between the applied adhesive 2 and the printed image 15. For example, if there is a change in the known longitudinal distance b there is a deviation of the applied adhesive 2 from the reference position which can be corrected. This can be performed for example by extending or shortening the distance between the printing device 13 and the intaglio printing device 4 for the application of adhesive, so that in this way the position of the adhesive application can be corrected.

A deviation of the lateral distance c between the application of adhesive 2 and the printed image 15 can be corrected for example by means of a lateral change in position of the printing cylinder 5 or by means of a rotary frame connected upstream of the intaglio printing device 4.

The adhesive 2 is preferably a self-adhering adhesive. By making the adhesive self-adhering any unwanted sliding of the plastic film can be prevented during application onto an object. This is particularly important for the production of sleeves for cigarette packaging. During the application of the self-adhering transparent plastic film 14 with the printed sleeve on the cigarette packaging it is possible to prevent the sleeve from slipping, which may occur if a moist adhesive is applied immediately after the application of the sleeve.

As shown in FIG. 4, the recess 8 can have a greater depth in a section 16 at the front in relation to the rotational direction of the printing cylinder 5 and delimited by a front edge of the recess 8 than in a rear section 17 delimited by a rear edge of the recess 8. By means of this design of the recess a very precise and sharp-edged delimitation of areas with adhesive and areas without adhesive can be achieved. The front section 16 of the recess 8 begins at the front edge of the recess 8 and ends at the beginning of the rear section 17. The rear section 17 extends up to the rear edge of the recess 8. The front section 16 can have a uniform, constant depth over its entire length and/or width. The rear section 17 can also have a uniform, constant depth over its entire length and/or width. The "length of the recess" is defined as the longitudinal extension of the recess in the rotational direction of the printing cylinder 5. The "width of the recess" is defined as its width perpendicular to the longitudinal extension of the recess. According to the embodiment shown the recess can have the outline shape of a rectangle, but of course depending on the desired form of the adhesive application also other outline shapes are possible, for example trapezoid, rhomboid, ellipsoid shapes etc. Furthermore, the transition between the front and rear section can be configured as a step. According to a further embodiment of the invention between the front section 16 and the rear section 17 the depth of the recess can also decrease continually. In all embodiments of the recess 8 it is advantageous however, if the recess 8 in the area around its front edge, as viewed in rotational direction or in an area immediately adjacent to this front edge has a greater depth than in the region around its rear edge as viewed in rotational direction or in an area immediately adjoining this rear edge. The depth of the recess 8 is defined here as the distance between the base and an upper edge of the recess 8. Only by means of the special configuration of the recess 8 with a greater depth in its front section 16 than in its rear section 17 can an optimal and fine-edged application of adhesive be achieved without the applied adhesive running.

For example, the rear section 17 according to a non-restrictive embodiment variant can have a depth that is 40% lower than the front section 16. Of course, other ratios between the depths of the front section 16 and the rear section 17 are possible. Mainly the selection of the ratio of the depths or volumes of the sections 16 and 17 depends on the amount of adhesive 2 to be applied and its adhesive strength.

LIST OF REFERENCE NUMERALS

1 Device for applying an adhesive
2 Adhesive
3 Substrate
4 Intaglio printing device
5 Printing cylinder
6 Impression roller
7 Squeegee
8 Saucer
9 Surface sections of the printing cylinder, which do not receive adhesive
10 Optical measuring device
11 Light source
12 Sensor
13 Printing device
14 Plastic film
15 Printed image
16 Front section of the recess of the printing cylinder
17 Rear section of the recess of the printing cylinder

The invention claimed is:

1. A method for applying an adhesive to a substrate by means of an intaglio printing method, the adhesive being applied to the substrate only in predefined areas using two rotating rollers, of which one is in the form of a printing cylinder and one is in the form of an impression roller, in which the printing cylinder and the impression roller rotate together in a transport direction of the substrates, wherein the adhesive is applied by means of at least one recess formed on the surface of the printing cylinder, the at least one recess in a front section in relation to the rotational direction of the printing cylinder having a greater depth than a rear section, wherein the rear section and the front section have a respective constant depth, wherein the front section begins at a front edge of the at least one recess and ends at a beginning of the rear section, and wherein the at least one recess consists of the front section and the rear section.

2. The method for producing a band-shaped plastic film, which comprises at least one printed image and is provided with an adhesive, wherein a method as claimed in claim 1 is used for applying the adhesive.

3. The method as claimed in claim 2, wherein a self-adhering adhesive is used as the adhesive.

4. The method as claimed in claim 2, wherein at least one position of the applied adhesive is determined optically on the plastic film.

5. The method as claimed in claim 2, wherein the printed image is applied to the plastic film (14) prior to the application of the adhesive.

6. The method as claimed in claim 2, wherein a transparent plastic film is used.

7. The method as claimed in claim 2, wherein onto a side of the plastic film opposite the adhesive at least one non-stick coating is applied.

8. The method as claimed in claim 2, wherein the band-shaped plastic film is applied onto a cigarette package to form a sleeve.

\* \* \* \* \*